(12) United States Patent
    Plut

(10) Patent No.: US 8,912,999 B2
(45) Date of Patent: Dec. 16, 2014

(54) BACKGROUND PLATEAU MANIPULATION FOR DISPLAY DEVICE POWER CONSERVATION

(71) Applicant: Samsung Electronics Co., Ltd., Suwon-si (KR)

(72) Inventor: William J. Plut, Los Altos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/658,259

(22) Filed: Oct. 23, 2012

(65) Prior Publication Data

US 2013/0050296 A1    Feb. 28, 2013

Related U.S. Application Data

(63) Continuation of application No. 12/777,092, filed on May 10, 2010, which is a continuation of application No. 11/471,988, filed on Jun. 20, 2006, now Pat. No. 7,714,831, which is a continuation-in-part of application No. 10/891,734, filed on Jul. 15, 2004, now Pat. No. 7,580,033.

(60) Provisional application No. 60/487,761, filed on Jul. 16, 2003, provisional application No. 60/692,176, filed on Jun. 20, 2005.

(51) Int. Cl.
    *G09G 3/36*    (2006.01)
    *G06F 1/32*    (2006.01)
    *G09G 3/34*    (2006.01)
    *G09G 3/32*    (2006.01)
    *G09G 5/00*    (2006.01)

(52) U.S. Cl.
    CPC ............ *G09G 3/3208* (2013.01); *G06F 1/3265* (2013.01); *G09G 3/3406* (2013.01); *G09G 2360/16* (2013.01); *G09G 2320/0646* (2013.01); *G09G 2320/0686* (2013.01); *G06F 1/3218* (2013.01); *G09G 3/3611* (2013.01); *G09G 2320/062* (2013.01); *Y02B 60/1242* (2013.01); *G09G 2330/022* (2013.01); *Y02B 60/32* (2013.01); *G09G 2320/0626* (2013.01); *G09G 5/00* (2013.01); *G09G 2310/04* (2013.01)
    USPC .......................................... 345/102; 345/211

(58) Field of Classification Search
    CPC ............................................ G09G 3/34–3/3426
    USPC .................................................. 345/102, 211
    See application file for complete search history.

(56) References Cited

U.S. PATENT DOCUMENTS 3,795,765 A    3/1974  DeGroat
4,817,179 A    3/1989  Buck (Continued)

OTHER PUBLICATIONS

"Energy-adaptive Display Designs for Future Mobile Environments" Iyer et al. Proceeding of ModiSys 2003: The First International Conference on Mobile Systems, Applications, and Services, San Francisco, CA, May 2003.

(Continued)

*Primary Examiner* — Jonathan Boyd
(74) *Attorney, Agent, or Firm* — Jefferson IP Law, LLP

(57) ABSTRACT

Described herein are systems and methods that that reduce power consumption for an electronics device that includes a display. The power conservation systems and methods alter background video information not needed for interactive use when a user returns to a display after some period of inactivity. Power conservation also preserves video information for one or more graphical user interface items. Preserving a graphics item maintains a person's ability to detect the graphical user interface item, and return to it at a later time, even though the background video information has been altered to conserver power.

17 Claims, 7 Drawing Sheets

(56) References Cited

U.S. PATENT DOCUMENTS

| | | | |
|---|---|---|---|
| 4,952,917 | A | 8/1990 | Yabuuchi |
| 5,029,004 | A | 7/1991 | Shibayama |
| 5,270,818 | A | 12/1993 | Ottenstein |
| 5,359,345 | A | 10/1994 | Hunter |
| 5,488,434 | A | 1/1996 | Jung |
| 5,524,249 | A | 6/1996 | Suboh |
| 5,572,655 | A | 11/1996 | Tuljapurkar |
| 5,592,194 | A | 1/1997 | Nishikawa |
| 5,598,565 | A * | 1/1997 | Reinhardt ............ 713/323 |
| 5,615,376 | A | 3/1997 | Ranganathan |
| 5,619,707 | A | 4/1997 | Suboh |
| 5,625,826 | A | 4/1997 | Atkinson |
| 5,642,125 | A | 6/1997 | Silverstein |
| 5,675,364 | A | 10/1997 | Stedman |
| 5,719,958 | A | 2/1998 | Wober |
| 5,745,375 | A | 4/1998 | Reinhardt |
| 5,781,768 | A | 7/1998 | Jones, Jr. |
| 5,796,382 | A | 8/1998 | Beetson |
| 5,796,391 | A | 8/1998 | Chiu |
| 5,808,693 | A | 9/1998 | Yamashita |
| 5,822,599 | A * | 10/1998 | Kidder et al. ............ 713/324 |
| 5,880,728 | A | 3/1999 | Yamaashi et al. |
| 5,881,299 | A | 3/1999 | Nomura et al. |
| 5,914,751 | A | 6/1999 | Korth |
| 5,943,032 | A | 8/1999 | Nagaoka |
| 5,956,014 | A | 9/1999 | Kuriyama |
| 5,961,617 | A | 10/1999 | Tsang |
| 5,991,883 | A | 11/1999 | Atkinson |
| 6,026,179 | A | 2/2000 | Brett |
| 6,029,249 | A | 2/2000 | Atkinson |
| 6,031,914 | A | 2/2000 | Tewfik |
| 6,043,853 | A | 3/2000 | Shimazaki |
| 6,069,440 | A | 5/2000 | Shimizu |
| 6,076,169 | A | 6/2000 | Lee |
| 6,100,859 | A | 8/2000 | Kuriyama |
| 6,104,362 | A | 8/2000 | Kuriyama |
| 6,111,559 | A | 8/2000 | Motomura |
| 6,144,440 | A | 11/2000 | Osgood |
| 6,177,933 | B1 | 1/2001 | Young |
| 6,177,946 | B1 | 1/2001 | Sinclair |
| 6,232,937 | B1 | 5/2001 | Jacobsen |
| 6,278,887 | B1 | 8/2001 | Son |
| 6,297,601 | B1 | 10/2001 | Kang |
| 6,323,880 | B1 | 11/2001 | Yamada |
| 6,345,364 | B1 | 2/2002 | Lee |
| 6,356,284 | B1 | 3/2002 | Manduley |
| 6,362,835 | B1 | 3/2002 | Urbanus |
| 6,366,291 | B1 | 4/2002 | Taniguchi |
| 6,396,508 | B1 | 5/2002 | Noecker |
| 6,396,520 | B1 | 5/2002 | Ording |
| 6,408,293 | B1 | 6/2002 | Aggarwal |
| 6,411,306 | B1 | 6/2002 | Miller |
| 6,411,953 | B1 | 6/2002 | Ganapathy |
| 6,414,675 | B1 | 7/2002 | Shen |
| 6,452,610 | B1 | 9/2002 | Reinhardt |
| 6,453,076 | B1 | 9/2002 | Nakajima |
| 6,473,078 | B1 | 10/2002 | Ikonen |
| 6,473,532 | B1 | 10/2002 | Sheraizin |
| 6,496,165 | B1 | 12/2002 | Ide |
| 6,529,212 | B2 | 3/2003 | Miller |
| 6,552,736 | B2 | 4/2003 | Honda |
| 6,587,087 | B1 | 7/2003 | Ishizuka |
| 6,606,103 | B1 | 8/2003 | Hamlet |
| 6,611,608 | B1 | 8/2003 | Wu |
| 6,621,489 | B2 | 9/2003 | Yanagisawa |
| 6,628,067 | B2 | 9/2003 | Kobayashi |
| 6,657,634 | B1 | 12/2003 | Sinclair |
| 6,661,029 | B1 | 12/2003 | Duggal |
| 6,661,428 | B1 | 12/2003 | Kim |
| 6,667,727 | B1 | 12/2003 | Iwaoka |
| 6,677,924 | B2 | 1/2004 | Nakayama |
| 6,677,936 | B2 | 1/2004 | Jacobsen |
| 6,683,605 | B1 | 1/2004 | Bi |
| 6,691,236 | B1 | 2/2004 | Atkinson |
| 6,693,385 | B2 | 2/2004 | Koyama |
| 6,701,263 | B2 | 3/2004 | Jeong |
| 6,711,212 | B1 | 3/2004 | Lin |
| 6,724,149 | B2 | 4/2004 | Komiya |
| 6,724,151 | B2 | 4/2004 | Yoo |
| 6,731,815 | B1 | 5/2004 | Hu |
| 6,744,818 | B2 | 6/2004 | Sheraizin |
| 6,762,741 | B2 | 7/2004 | Weindorf |
| 6,768,520 | B1 | 7/2004 | Rilly |
| 6,774,878 | B2 | 8/2004 | Yoshida |
| 6,788,003 | B2 | 9/2004 | Inukai |
| 6,788,822 | B1 | 9/2004 | Zhang |
| 6,791,566 | B1 | 9/2004 | Kuratomi |
| 6,801,811 | B2 | 10/2004 | Ranganathan |
| 6,809,706 | B2 | 10/2004 | Shimoda |
| 6,812,650 | B2 | 11/2004 | Yasuda |
| 6,816,135 | B2 | 11/2004 | Ide |
| 6,819,036 | B2 | 11/2004 | Cok |
| 6,822,631 | B1 | 11/2004 | Yatabe |
| 6,829,005 | B2 | 12/2004 | Ferguson |
| 6,839,048 | B2 | 1/2005 | Park |
| 6,850,214 | B2 | 2/2005 | Nishitani |
| 6,900,798 | B2 | 5/2005 | Heie |
| 6,912,664 | B2 | 6/2005 | Ranganathan |
| 6,938,176 | B1 | 8/2005 | Alben |
| 7,012,588 | B2 | 3/2006 | Siwinski |
| 7,114,086 | B2 | 9/2006 | Mizyuabu et al. |
| 7,301,522 | B2 | 11/2007 | Ko |
| 7,312,771 | B2 | 12/2007 | Iwamura |
| 7,389,432 | B2 | 6/2008 | Chandley |
| 7,400,314 | B1 | 7/2008 | Agano |
| 7,432,897 | B2 | 10/2008 | Nishitani |
| 7,437,438 | B2 | 10/2008 | Mogul |
| 7,460,103 | B2 | 12/2008 | Konno |
| 7,463,235 | B2 | 12/2008 | Hiyama |
| 7,505,034 | B2 | 3/2009 | Nguyen |
| 7,580,031 | B2 | 8/2009 | Plut |
| 7,580,033 | B2 | 8/2009 | Plut |
| 7,583,260 | B2 | 9/2009 | Plut |
| 7,602,388 | B2 | 10/2009 | Plut |
| 7,602,408 | B2 | 10/2009 | Plut |
| 7,629,971 | B2 | 12/2009 | Plut |
| 7,663,597 | B2 | 2/2010 | Plut |
| 7,714,831 | B2 | 5/2010 | Plut |
| 7,760,210 | B2 | 7/2010 | Plut |
| 7,786,988 | B2 | 8/2010 | Plut |
| 2001/0032321 | A1 | 10/2001 | Nanno et al. |
| 2002/0063671 | A1 | 5/2002 | Knapp |
| 2003/0071805 | A1 | 4/2003 | Stanley |
| 2006/0020906 | A1 | 1/2006 | Plut |
| 2006/0071899 | A1 | 4/2006 | Chang |
| 2006/0101293 | A1 | 5/2006 | Chandley et al. |
| 2006/0125745 | A1 | 6/2006 | Evanicky |

OTHER PUBLICATIONS

"Energy-aware User Interfaces and Energy-adaptive Displays: Improving Battery Lifetimes in Mobile Devices" Geelhoed et al. Hardening Windows Systems 2000, System Experts 2001, Philip Cox et al.

* cited by examiner

BACKGROUND PLATEAU MANIPULATION FOR DISPLAY DEVICE POWER CONSERVATION

CROSS-REFERENCE TO RELATED APPLICATIONS

This application is a continuation of U.S. patent application Ser. No. 12/777,092, filed on May 10, 2010, which is a continuation of U.S. patent application Ser. No. 11/471,988, filed on Jun. 20, 2006 and claimed priority under 35 U.S.C. §119(e) from U.S. Provisional application No. 60/692,176 filed on Jun. 20, 2005, patent application Ser. No. 11/471,988 is also a continuation-in-part of U.S. patent application Ser. No. 10/891,734, filed on Jul. 15, 2004 and claimed priority under 35 U.S.C. §119(e) from U.S. Provisional application No. 60/487,761 filed on Jul. 16, 2003, the entire disclosures of which are hereby incorporated by reference.

BACKGROUND OF THE INVENTION

1. Field of the Invention

This invention relates to systems and methods that reduce power consumed by an electronics device including a display. More particularly, the present invention relates to techniques for conserving power by altering video information for background portions of a display area.

2. Description of the Related Art

Video output consumes a significant amount of power for a laptop or desktop computer. Other computing systems and electronics devices—such as handheld computing devices, cellular telephones and music players—also devote a large fraction of their power budget to video. Power consumption sensitivity increases for portable devices that rely on a battery having limited energy supply.

Currently, commercially available power conservation techniques alter an entire image at once. Most techniques uniformly shut down a display or unvaryingly modify all video output in an image after some predetermined time. These techniques usually impede a person's ability to see graphics items and further use the computing device. Frequently, a person responds by reactivating the entire display—at full power. As a result, little power is saved.

SUMMARY OF THE INVENTION

The present invention provides systems and methods that reduce power consumption for an electronics device that includes a display. The power conservation systems and methods alter background video information not needed for interactive use when a user returns to a display after some period of inactivity. For example, the methods may decrease the luminance for background video information outside any graphical user interface items.

Power conservation also preserves video information for one or more graphical user interface items. Preserving a graphics item maintains a person's ability to detect the graphical user interface item, and return to it at a later time, even though the background video information has been altered to conserver power.

In one embodiment, the background alterations decrease luminance for background video information. This often makes graphics components included in a display area more detectable to a user, which facilitates return to the display area—even though the majority of background video information has been altered to conserve power.

In one aspect, the present invention relates to a method for reducing power consumed by an electronics device that includes a display device. The method includes altering background video information to produce altered background video information such that the display device will consume less power when displaying the altered background video information than an amount of power that would be required to display the background video information without the alteration. The method also includes at least partially preserving video information for a graphical user interface item. The method further includes displaying the altered background video information with the preserved video information for the graphical user interface item.

In another aspect, the present invention relates to a rate-based method for reducing power consumed by an electronics device that includes a display device. The method includes altering video information for a graphical user interface item at a first rate to produce altered video information for the graphical user interface item. The method also includes altering background video information at a second rate that is greater than the first rate. The method further includes displaying the altered video information for the graphical user interface item and the altered background video information.

In yet another aspect, the present invention relates to a computer readable medium including instructions for reducing power consumed by an electronics device that includes a display device.

These and other features of the present invention will be presented in more detail in the following detailed description of the invention and the associated figures.

DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The present invention alters background video information in a display area for a display device to permit power conservation for the display device (or an electronics device that includes the display device). For example, the video alterations may include luminance and RGB level reductions that require less current per pixel for an OLED display device. Techniques for LCD power conservation according to the present invention are also described below.

In addition to saving power, the background video alterations may also enhance visual detection of graphics items included in a display area. In one embodiment, the alterations darken or otherwise dull the background video, which makes the graphics components in a display area more visually noticeable relative to the altered background. In human visual processing, this is referred to as the contrast effect. As a visual analog: when a flower is placed in front of a bright background, its colors will appear duller than when it is placed in front of a dark background. Color and visual recognition thus improves when the flower is placed in front of a darker background.

FIGS. 1A-1D illustrate this contrast effect of human visual processing and how the present invention alters background video information to enhance detection of a graphics item 5 and/or save power. FIGS. 1A-1D show several video output states (2, 4, 10 and 12) of a graphics item 5 and a background 6.

The vertical column in each state quantifies relative luminance between graphics item 5 and background 6. For example, one suitable measure for quantifying the relative luminance is average luminance, or the average of luminance values for pixels used in displaying each of graphics item 5 and background 6. The average luminance may be set in a range of 0-240 or normalized for each pixel, for example. Other comparative luminance measures are also suitable for use to compare graphics item 5 and a background 6.

Figure 1A:
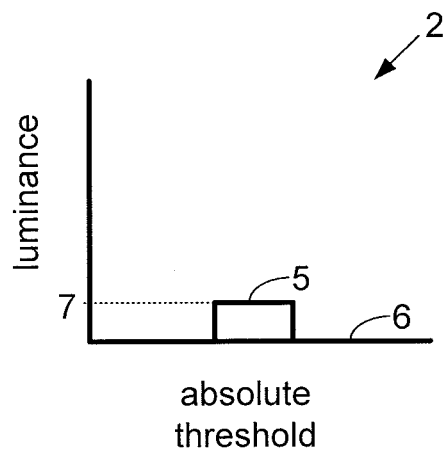
FIGS. 1A-1D illustrates this contrast effect of human visual processing and how the present invention may be used to enhance detection of a graphics item.

As shown in FIG. 1A, a first state 2 corresponds to perception of item 5 when a background 6 is at a zero luminance (state 2 thus shows an absolute threshold luminance 7 for detecting graphics item 5). Human visual processing relies on a minimum distinction criterion between the luminance of item 5 and the surrounding—or background—luminance to detect item 5 when it is visually presented with the background. In this instance, a luminance difference between graphics item 5 and the background luminance of zero represents the minimum luminance distinction criterion (as shown, luminance 7, which is relative to zero in state 2, refers to the minimum luminance needed to detect graphics item 5). If this minimum luminance difference decreases and becomes too small, most people will not be able to visually discern item 5 from background 6.

Figure 1B:
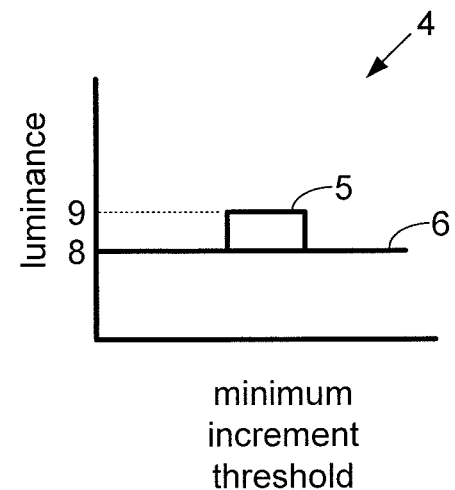

As shown in FIG. 1B, a second state 4 corresponds to perception of item 5 when item 5 includes an elevated luminance 9 and is presented with a background 6 that has an elevated background luminance 8. In this instance, elevated luminance 9 maintains the minimum distinction criterion luminance 7 relative to background luminance 8, and graphics item 5 remains visible in when presented with background 6.

As the luminance difference between the two increases, item 5 typically becomes easier to detect and discern from background 6. This contrast effect applies to visual processing in general, and is used by the present invention in the context of altering video information on a computer display.

The luminance of background video information in a display thus affects detection of graphical user interface items presented with the background. A power conservation designer can alter background video information to accomplish one or more goals.

Figure 1C:
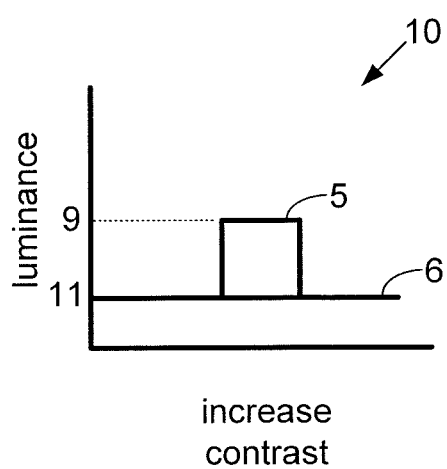

In one embodiment, power conservation design decreases background luminance to make graphics item 5 more detectable on a display device. This occurs by reducing luminance of the background video information 6 relative to luminance for the graphical user interface item 5. State 10 of FIG. 1C shows this graphically, where a new background aggregate luminance 11 reduces to create a large relative luminance difference between graphics item 5 and background 6, which eases or improves perception of graphics item 5.

Figure 1D:
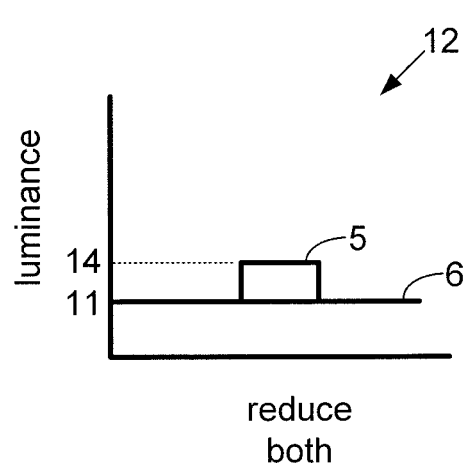

In another embodiment, decreasing the background luminance allows a graphics item 5 to be displayed at a lower luminance while still maintaining detectability of graphics item 5. In other words, so long as the minimum detection criterion is not breached, the luminance of graphics item 5 may decrease with the reducing background luminance. State 12 in FIG. 1D shows this dual decrease; graphics item luminance 14 minus background luminance 11 is greater than or equal to minimum detection luminance 7. This option is useful to permit alteration of graphics item 5, e.g., to further conserve power in an OLED display device. This option is also useful in LCD devices to bring all video information in a display area under a new maximum luminance that permits a lower backlight luminance level (and thus less power consumption for the LCD, see FIG. 4) to be used.

Power conservation design may implement states 10 and 12 to varying degrees, e.g., to make information more or less visible, or to save more or less power, as desired. Combinations of states 10 and 12 may be implemented.

Graphics components made more visible by background video information alterations may include windows, icons, toolbars, and/or portions thereof. The background video information typically occupies a large fraction of a display area outside these smaller items. As a result, alterations to the background video information may dominate perceived aggregate luminance for the entire screen, and thus drive energy conservation for the display device (e.g., OLED or LCD device) or electronics device.

Power conservation methods and systems described herein alter background video information such that the alteration decreases power consumption for a display device or an electronics device. The background video information is altered at some time (e.g., due to inactivity in the display area) according to power conservation system design. For example, a person may stop using a handheld or laptop computer for some time. The present invention identifies at least one graphical user interface item that may be relevant to a person when the person returns to using the device. Video information for the background alters (e.g., darkens) while the graphical user interface item is at least partially preserved so as to maintain a person's ability to subsequently detect the graphics item.

A background video alteration may include decreasing the brightness and luminance, altering color for the background video information to make the background color duller, etc. Several suitable alterations are described below. Background video alteration may occur once, multiple times, or continuously according to power conservation control. Often, alteration produces or progresses to a state where the background video information is significantly visibly degraded—or even unrecognizable. For example, luminance for the background video information may be reduced to black, or some minor fraction of its original luminance level.

These alterations may degrade visual quality and/or perceptibility of the altered background video information. In one embodiment, the graphical user interface item(s) are left untouched and unaltered. In another embodiment, video information for the graphical user interface item is also altered to decrease power consumption. In either case, the present invention preserves a person's ability to see and detect the graphical user interface item(s) at a later time when the background video information has been significantly altered.

The amount of power conserved will depend on the display device. OLED devices are current driven devices where electrical current flow to individual pixel elements varies with light output and video information for each pixel. Reducing RGB values for each pixel (or luminance, which also reduces RGB values) draws less current on a pixel-by-pixel basis. For many LCD devices, perceived luminance at each pixel of the LCD is a combination of backlight level and transmissivity of the video information using pixilated filters. To reduce power, the graphics controller may alter video information so as to reduce transmissivity to a point where a lower backlight level may be used when displaying lower luminance video information. Hardware power consumption (and conservation) is described in further detail below.

The present invention at least partially preserves visual perception for portions of a display area that are typically returned to after inactivity, including graphics items such as icons, windows or window borders, and toolbars. When a user returns to the display device after some period of inactivity, even though the background video information has been altered and degraded (and corresponding power savings achieved), the user may still readily detect and recognize a preserved graphics item and use it to readily return to usage of the electronics device without any intermediate steps or without activating the entire display, e.g., just to check the time. The present invention thus preserves the person's ability to see and detect a graphical user interface item and maintains their ability to quickly return to usage of the device. This also avoids annoyance by users who prefer to be able to see some active video at any time, which assures a user that a computer has not entered a hibernate mode (entire screen shut-downs are often confused by users as a hibernate mode, are very noticeable in their sudden luminance change, and commonly cause a user to re-activate an entire display to avoid entering the hibernate mode, resulting in minimal power savings).

The present invention finds use with a wide array of display devices and electronics devices. For example, desktop and laptop computers with 12-20" display areas, measured diagonally, are now common and may benefit from techniques described herein. The present invention is particularly useful for portable electronics devices powered from a battery or other limited source of energy. Video power conservation techniques described herein may significantly extend battery longevity and useable time for a portable electronics device.

Figure 2A:
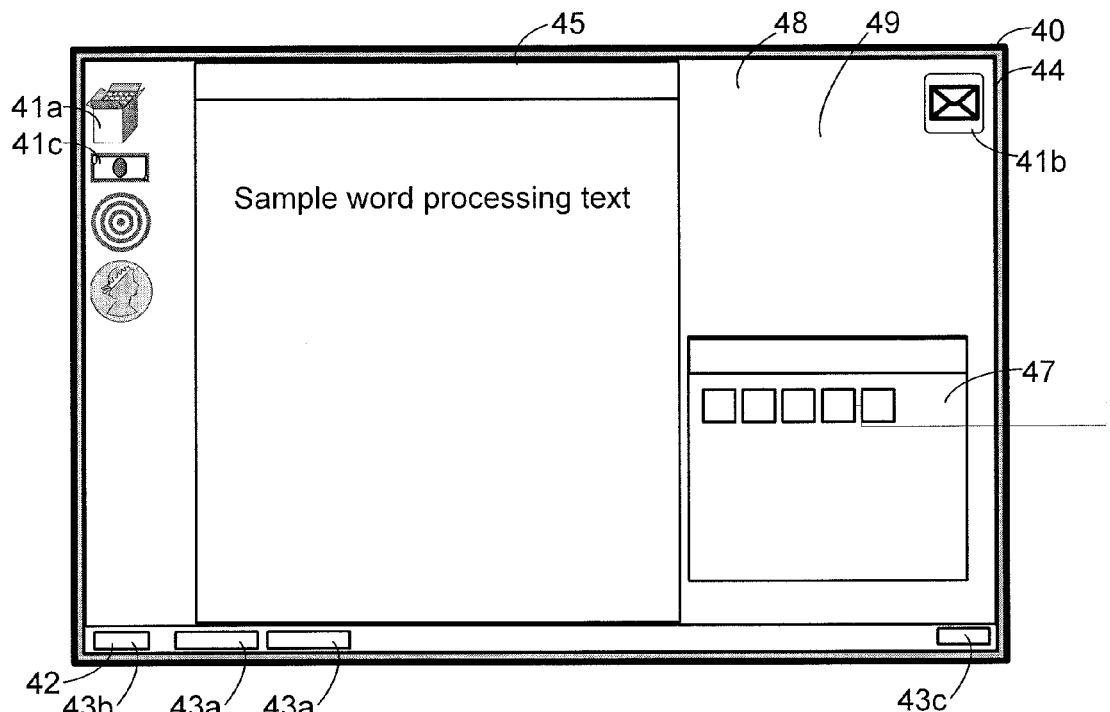
FIG. 2A illustrates video information output on a display device suitable for use with a laptop computer or desktop computer in accordance with one embodiment of the present invention.

FIG. 2A illustrates video information output on a display device 40 suitable for use with a laptop computer or desktop computer. While the present invention will now be described as video information, graphical user interface items, graphics components and hardware components, those skilled in the art will recognize that the subsequent description may also illustrate methods and discrete actions for reducing power consumption for a display device and associated electronics device.

Display device 40 displays video information, and may include a liquid crystal display (LCD) device, for example. Other display devices and technologies are suitable for use.

Display device 40 outputs video information for a laptop or desktop computer within a display area 44. Display area 44 refers to a current image size of a display device. Pixel dimensions may characterize the size of display area 44. Physical dimensions (e.g., inches) that span an image produced by the display device may also characterize the size of display area 44.

An electronics device, such as a desktop, laptop or handheld computer, often runs a graphics-based user interface 42. The graphics-based user interface 42 facilitates interaction between a user and a computer and/or between the user and one or more programs run on the computer. Several suitable graphics-based user interfaces 42 are well known and commercially available, such as those provided by Microsoft of Redmond, Wash., and Apple Computer of Cupertino, Calif., for example.

The video information refers to data for display using the display device 40 to produce a visual representation. The video information is typically stored as data in a logical manner using values assigned to pixel locations. The pixel locations may correspond to a pixel arrangement used for device 40 and/or an arrangement used for storing the data. Exemplary color schemes suitable for assigning values to video information are described below. Stored video information may include a resolution that may or may not match a resolution for display device 40. For example, picture video information used for background 48 may be stored as a bitmap having a resolution that does not match the resolution of display area 44.

Referring to FIG. 2A, video information output on LCD 40 currently includes graphical user interface items 41 and 43. In one embodiment, a graphical user interface item (or graphics item) refers to a graphics component for display as a discrete visual object on display device 40. The graphical user interface item may include a toggle, toolbar, icon, clock, and/or other small graphics component relevant to usage of the electronics device. For example, each graphics item may include video information corresponding to a program run on interface 42 or to visual output for an interactive feature of interface 42. The graphical user interface items may allow a user to select or initiate a program offered on user interface 42, use or select a feature offered with interface 42, input data, display information, open programs, open and minimize windows, etc. As shown in FIG. 2A, graphical user interface items include icons 41 related to programs offered by interface 42 and a toolbar 43 associated with interface 42. In general, the present invention is not limited to any particular graphical user interface item provided on a display device or function related thereto.

Icons 41 are popular graphical user interface items and typically include a characteristic graphics component that identifies and corresponds to a particular program. Some icons 41 provide an initiation shortcut to a program, while others initiate a menu for interface 42. Popular programs include word processing programs, file navigation programs, Internet Browsers, drawing programs, music player programs, and video games, for example. The examples shown include a trash icon 41a, an envelope icon 41b to initiate an email program available to the electronics device and offered by interface 42, and a dollar icon 41c to initiate a money management program. Other icons may be used and are known to those of skill in the art. A user may select or initiate a program by positioning a pointer and selecting the visual icon 41 for a program.

Toolbar 43 is a visual tool provided by graphics-based user interface 42 that includes a number of graphics items to help a user interact with the electronics device and programs provided thereon. Toolbar 43 includes a toggle 43a for each program currently active in display area 44, a pull-down menu 43b for accessing programs and options offered by the graphics-based user interface 42, and a clock 43c. Selecting a toggle 43a displays or minimizes a graphics item corresponding to the toggle 43a.

Graphics items 45 and 47 are also shown in display area 44 and each correspond to video output for a program currently running on user interface 42. Rectangular windows are common graphics items and may vary in size from a maximum size that roughly spans display area 44 (minus toolbar 43) to smaller sizes within display area 44. The rectangular windows may also be operated in minimized states where the program is active but the graphics item is not visible. A toggle 43a for the program allows switching between these states. For FIG. 2A, graphics item 45 includes a rectangular window that corresponds to a word processing program, while item 47 includes a window that corresponds to a file navigation program.

Background 48 represents a backdrop graphics item for graphics-based user-interface 42, and may include a picture, single color or other backdrop graphics. Background 48 typically includes its own set of background video information 49, which may separated for alteration and manipulation to conserve power as described herein. In one embodiment, the background video information generally refers to video information in a display area used for backdrop visual appearance or any video information in a display area. This typically includes all video information other than that included in graphics components associated with active programs, icons, toolbars, windows, etc., whose video information is to be preserved. Often, the background video information is not associated with a program actively being used, such as word processing and file navigation windows.

Figure 2B:
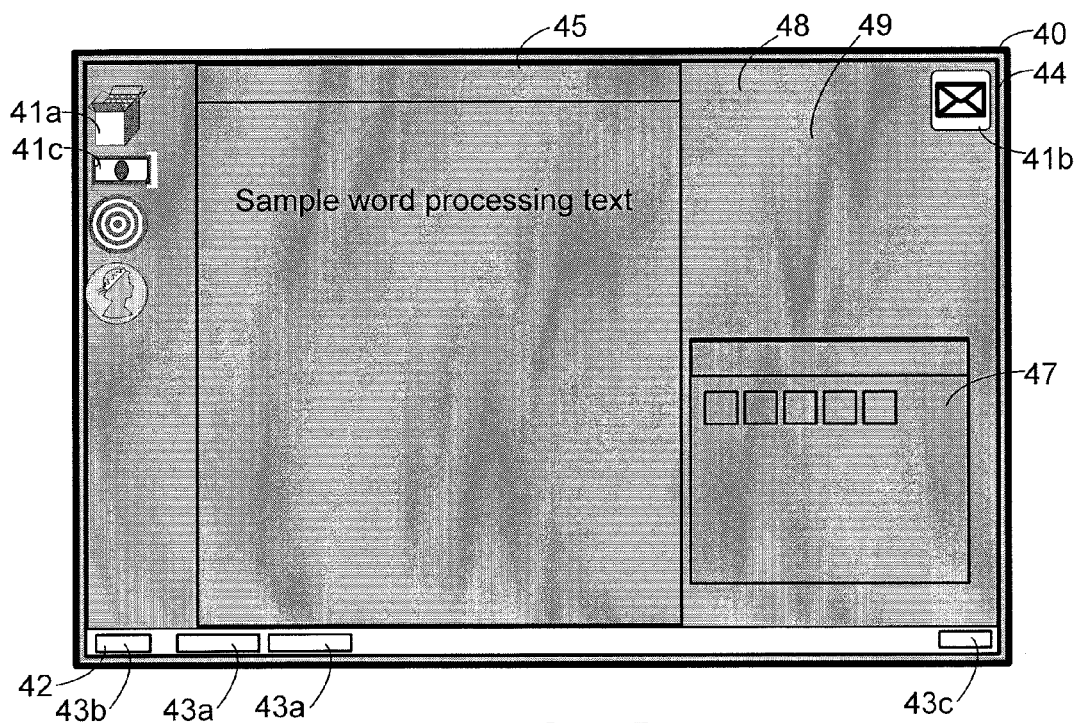
FIG. 2B illustrates the display device of FIG. 2A after video information alteration and graphical user interface item preservation in accordance with a specific embodiment of the present invention.

FIG. 2B illustrates display area 44 as a result of inactivity in accordance with a specific embodiment of the present invention. The present invention alters background video information 49 such that a display device outputting the altered video information consumes less power than an amount of power required to display the video information without alteration. As shown, luminance for the background video information 49 is reduced. Additional power conservation alterations will be described in further detail below.

As shown in FIG. 2B, toolbar 43 and any toggles included therein have not been decreased in luminance. In addition, video information for icons 41 has not yet been altered. Graphics items 45 and 47 have been altered and darkened. In another embodiment, graphics items 45 and 47—or a portion of each—are preserved with icons 41 and toolbar 43. For example, border portions of graphics items 45 and 47 may be preserved to facilitate subsequent edge detection of each window using the preserved edge information for each window.

In another embodiment, the present invention alters video information for icons 41 such that border portions for each icon 41 are subsequently illustrated with increased contrast relative to internal portions of each icon. More specifically, video information in internal portions of each icon 41 may be altered while outer portions of each icon 41 remain unmodified. Background video information 49 that borders each icon may also be preserved to enhance edge detection of each icon 41 and quick visual recognition. This allows icons 11 to be recognized based on their edge and shape information without requiring full video output from each icon.

Color information for toolbar 43 and icons 41 may also be preserved. Many icons include one or more characteristic colors that facilitate recognition, such as the green in dollar bill icon 41c. In one embodiment, the present invention preserves the characteristic colors of a graphical user interface item. This maintains the ability to identify the graphical user interface item based on its color appearance. Dulling background 48 also facilitates this color recognition, similar to the increased processing of colors on a black or darkened background as done by painters to increase effect of colors used in a painting.

The graphical user interface items are typically small relative to the size of the display area 44. In one embodiment, each graphical user interface item occupies less than about 10 percent of a display area for the display device. This ratio may be determined by pixel count comparison between a graphical user interface item and display area 44, for example. The exact ratio may vary and will depend on the graphical user interface item, display area, electronics device type (e.g., handheld, laptop, desktop, etc.) and a particular manufacturer. In a specific embodiment, the graphical user interface item occupies less than about 5 percent of a display area for the display device.

The present invention allows a user to see and readily use graphical user interface items 41 and 43 within display area 44—which may constitute a relatively small proportion of display area 44—while reducing video output and power consumption from the rest of the display area 44. In contrast, conventional display devices and power conservation require the entire display area to be active and consume power.

Figure 3A:
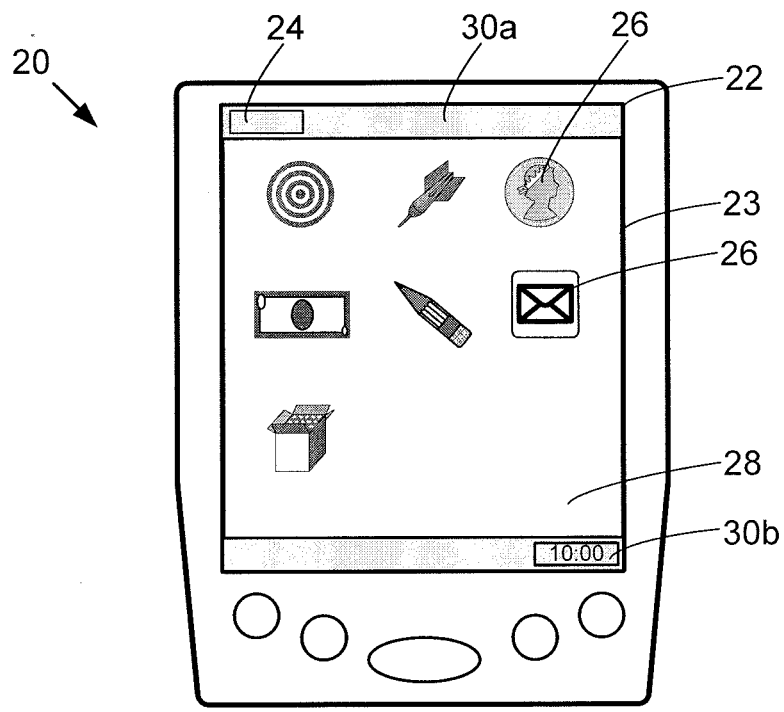
FIG. 3A illustrates a handheld computer device in accordance with one embodiment of the present invention.
Figure 3B:
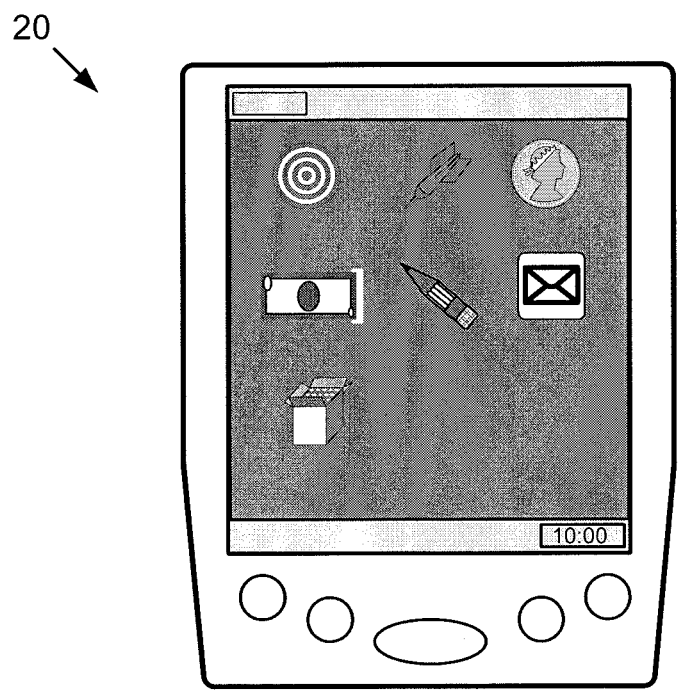
FIG. 3B illustrates the handheld device of FIG. 3A after video information alteration and graphical user interface item preservation in accordance with a specific embodiment of the present invention.

FIG. 3A illustrates a handheld computer device 20 in accordance with another embodiment of the present invention. FIG. 3B illustrates handheld device 20 after background video information alteration in accordance with a specific embodiment of the present invention.

Handheld computer device 20 includes a display device 22 that displays video information. Individual pixel locations within a display area 23 for device 22 permit allocation and addressing of video information displayed within a display area 23. For example, display device 22 may include an OLED display device that offers pixel dimensions of 480× 640. The OLED device 22 permits video information changes for individual pixels to affect power consumption and conservation with pixel granularity.

Handheld device 20 runs a graphics-based user interface 24 within display area 23. Interface 24 facilitates interaction between a user and device 20 and/or between the user and one or more programs run on computer device 20. To do so, interface 24 outputs video information on display device 20. As shown in FIG. 3A, interface 24 currently displays a background 28 and a set of icons 26 that each corresponds to a program available on device 20. The icons 26 are displayed in front of background 28, which includes its own set of background video information and provides a backdrop environment for graphics-based user interface 24. Two toolbars 30 are output in display area: a top toolbar 30a that includes a pull-down toggle for interface 24 and a bottom toolbar 30b that includes a clock.

FIG. 3A illustrates display area 23 before alteration of background video information in display area 23, while FIG. 3B shows display area 23 after alteration of the background video information. As shown in FIG. 3B, video information in background 28 has been decreased in luminance and turned to black. Lesser alterations to the video information in background 28 may be used.

Notably, the present invention conserves power without substantially compromising usability of electronics device 20. More specifically, the video information is altered such that the person may still visually detect icons 26 and toolbars 30 in display area 23. Thus, a user may still perceive visual information relevant for interaction after returning to the display after a period of non-usage. In many instances, depending on the video information and how it is altered, darkening background 28 may make icons 26 more detectable. This may also include darkening a background that was originally white, or another relatively bright shade.

Thus, as shown in FIG. 3B, the background video information alterations simultaneously perform two functions: a) they reduce power for the OLED device, and b) the help a viewer detect and find preserved graphics components in a display area after video information alterations to conserve power begin.

While FIGS. 2 and 3 illustrate two specific electronics devices, power conservation techniques described herein are also well suited for use with other electronics devices. Other exemplary devices include cellular telephones, portable music players, digital cameras, and other portable computing and electronics devices that include a video display.

Having discussed exemplary display devices and graphics, power conservation will now be expanded upon.

The present invention may implement a wide array of video alterations to conserve power. In general, the alteration reduces the amount of power that would be required to display the altered background video information relative to the video information without the alteration. Alterations may vary according to the video information, time, usage of the electronics device, the display device and its power consumption characteristics, etc.

In one embodiment, video alteration occurs based on user activity—or lack thereof. Activity may comprise a) user input for one or more programs—as determined by each program, b) program output to the user—again, as determined by the program, and/or c) user input in a background or interaction with a user interface.

Interaction that qualifies as activity is related to the programs being run, and may vary with power conservation system design. For example, user input and activity for a word processing program running on graphics component 45 of FIG. 2A may include: typing within the window 45, positioning a pointer within the window 45, clicking a button (e.g., using a mouse) within the window 45, manipulating menus and scrollbars within the window 45, a subset of these chosen by design, etc. User input for a music player program running on graphics component may include selecting songs to be played or manipulating volume and other audio output features. Video output for a music player program may include temporally-varying video that changes with the music based on program operation—without regular user input—such as an equalizer output or a clock that counts music time as a song plays. In one embodiment of the present invention, the music player program maintains an active graphics components status as a result of the temporally varying video output. In another embodiment, the power conservation system is designed such that temporally varying video output for the music player program does not qualify as activity. User input for an Internet browser window may include positioning a pointer within the window, typing addresses, and opening links, for example. In one embodiment, activity comprises temporally varying video output provided by a program whose video output intentionally varies over time without continued user input, such as a movie player. Video output is also common with Internet browsers and may or may not constitute interaction based on power conservation system design. User input for background 48 includes moving a pointer within background 48, selecting ('clicking' or 'double clicking') an icon 41, accessing individual items on control bar 43, etc.

Inactivity for a graphics component implies a lack of interaction in the inactive portion. As activity described above depends on a program associated with the graphics component, so does inactivity. In one embodiment, inactivity is defined for an individual graphics component according to a lack of activity for the graphics component, which will depend on the program associated with the graphics component. Thus, inactivity for word processing graphics component 45 includes a lack of typing within the window boundary, a lack of positioning a pointer within the window boundary, a lack of manipulating menus and scrollbars within the window boundary, etc. Inactivity for background 48 may include a lack of positioning a pointer within the background 48 perimeter, a lack of initiating icons and menus, etc.

In one embodiment, the power conservation methods use a threshold inactivity time to determine when alterations to a background begin. The power conservation methods may alternatively alter a background immediately with inactivity in the display area. Once the threshold inactivity time has been reached, output power for the display device decreases according to one or more video manipulation techniques and the display device type. A user may set the threshold inactivity time via a graphics control. A threshold inactivity time may also be set according to power conservation design.

In one embodiment, after the threshold inactivity time, video alterations and power conservation may continue at set power reduction intervals. The power reduction intervals determine specific times after the threshold inactivity time at which further video alterations are applied. This allows the altering video information to gradually change—and power conservation to gradually increase—over time and according to power conservation design and/or user preference. A user may set the power reduction intervals using a graphics control, for example. Alternatively, they may be set with power conservation system design. In order for a power reduction interval to be met, inactivity continues in the display area or window for the duration of the interval. The threshold inactivity time and power reduction intervals are a matter of system design and user choice and may be different time periods.

Once the threshold inactivity time has past, the present invention alters background video information (and possible video information for a graphical user interface item as well) such that a display device will consume less power than that which would be required without alteration. In addition, video information outside a graphical user interface item may continue to adapt as time proceeds to further reduce power consumption. An array of video manipulation techniques may be employed by the present invention to reduce power consumption.

Power conservation as shown in FIG. 2B reduces luminance for the background video information. In one embodiment, the present invention reduces the luminance for all pixels in the background by the same amount. In other words, the altered video information becomes darker by subtracting a constant value from the luminance value for each pixel. This effectively shifts a luminance histogram for the altered background video information to a darker state. Such a luminance reduction may be implemented at a threshold inactivity time and at each power reduction interval.

The constant value may include a function of i) a maximum luminance for the background video information (such as a percentage), ii) a maximum luminance provided by the display device, iii) a mean, median or mode of luminance values for the background video information, or iv) a mean, median or mode of a luminance range values provided by the display device, etc. A suitable percentage of the maximum luminance for the background video information may range from about 1 percent to about 100 percent of the maximum luminance. Thus, a 100 percent reduction turns the background video information black at the threshold inactivity time and maximizes energy conservation. A 1, 2 or 5 percent luminance reduction at the threshold inactivity time and each power reduction interval thereafter steadily decreases luminance over time. Values less than 1 percent may be used for subtle and/or high frequency changes. Smaller alterations may be preferable to some users who prefer a less dramatic visual change. It is also understood that the percentage reduction at the threshold activity time and each power reduction interval may be different levels. For example, a 5 percent luminance reduction may be implemented at the threshold inactivity time, while a 2 percent, 10 percent, or escalating (0.25, 0.5, 1, 2, 4, 6, 8, 10 percent, etc.) reduction may be used at each power reduction interval.

In one aspect, the present invention builds a histogram for a set of pixels being altered and reduces power consumption for the pixels using one or more histogram-manipulation techniques. The histogram is a representation showing, for each pixel value (e.g., luminance or chroma), the number of pixels in an image that have that pixel value. One embodiment alters pixel values by compressing and shifting a luminance histogram. More specifically, a luminance histogram is first constructed for a set of pixels to be altered. The luminance histogram is then compressed on the high and low ends, e.g., about the mean, median or mode. A shift subsequently reduces the luminance values for all pixels in the compressed set by a constant. One suitable constant is a number that gives a pixel with the lowest luminance value in the new compressed histogram a zero luminance. The altered video information becomes darker since the final histogram luminance varies from zero luminance to a new maximum luminance produced as a result of the compression and shift.

A suitable amount of luminance compression may range from about 1 percent to about 50 percent of histogram luminance range. Another suitable compression may range from about 5 percent to about 20 percent of histogram luminance range. Compression and shifting may occur at the threshold inactivity time and at each power reduction interval, if desired. This process may repeat at subsequent power reduction intervals until the video information outside the graphical user interface item is almost black or until a predetermined cutoff is reached. Suitable cutoffs include: when the maximum luminance value outside the graphical user interface item reaches a predetermined minimum luminance, when the histogram reaches a minimum width, or when the difference between subsequent iterations is minimal.

The present invention may implement other compression and shift schemes. In one embodiment, the luminance histogram for a set of pixels is compressed only on one side, e.g., on the high end. If the histogram compression occurs just on the high end, the video information becomes darker for brighter pixels only. If the histogram compression occurs only on the low end of luminance values and then a shift is applied, the video information becomes darker for all pixels.

Although the present invention has primarily been discussed so far with linear and simple reductions in luminance for pixel values, a power conservation system designer may apply more complicated video alteration and power conservation schemes. The relationship between power reduction, video alterations, and time may be established according to system design. One suitable power conservation scheme applies stepwise reductions of predetermined values at predetermined times. Another power conservation scheme employs an exponential decrease in luminance values as time proceeds. In this case, luminance reduction starts slowly in an initial time span, increases gradually in some midpoint time span, and then increases sharply in a later time span. A linear reduction based on $y=F(x2)$, where y is a current luminance reduction, x represents the ith alteration in a number of alterations over time, and $F(x2)$ is some function that increases power conservation as inactivity time passes or increases exponentially with a number of alterations to the video information. Linear constants and other mathematical operators may be inserted into the equation to alter video alterations as desired. Logic may also be applied in the video information manipulation to achieve a desired luminance vs. time curve.

Logic that limits further alterations to video information in subsequent power reduction intervals may also be implemented. At some point, the entire display area may be turned off. One suitable logic applies a lower limit that values of individual pixels in a background may be reduced to, such as a percentage of an initial luminance or chroma level. For example, luminance reductions may cease for a pixel once the pixel reaches from about 5 percent to about 50 percent of its initial level—regardless of how it reached this point. Time may also be used. For example, all video information outside the graphical user interface item may be turned off or turned black at a predetermined time. In addition, the entire display area, including the graphical user interface items, may be turned off at some second predetermined shut-off time.

In another embodiment, luminance reduction occurs gradually over time at smaller intermittent time intervals (e.g., less than a minute) and small luminance alterations, as opposed to larger and less frequent alterations. This technique provides a more gradual power reduction without sharp or noticeable changes in video content. For example, luminance in an inactive portion may decrease 1 percent every 10 seconds, thereby decreasing luminance by 60 percent over ten minutes without a large and obvious single change.

Advantageously, the present invention permits more aggressive alterations and power conservation, if desired, to background video information since the video information being altered is rarely needed by a user upon return to the device after inactivity.

In another embodiment, color in the background video information is altered to facilitate visual detection of graphics items. More specifically, hue reductions in the background are applied to increase color recognition of the graphics items by reducing the relative amount of competing color information on the screen. The chroma alterations may include reductions in saturation for example to RGB values in the background video information. The reductions in saturation may also facilitate luminance alterations to conserve power. More specifically, the alterations may reduce saturation of the background video information to grey shades that facilitate less noticeable backlight luminance levels in an LCD device. In another embodiment, the alterations reduce saturation of the video information to make preserved colors in the graphics items more visibly when a user returns to the display area. In either scenario, the chroma alterations may be aggressively applied at a single given alteration since the eye is less likely to detect chroma alterations for a large display area or if the user is not looking directly at the display area (peripheral vision has minimal chromatic sensitivity).

Having discussed exemplary graphics, video information preservation, and video information alterations, video information representation and hardware power consumption/conservation will now be described in further detail. In general, video information alterations may include any changes to video information that decrease power consumption, and are not limited to any particular color scheme used by the hardware or by the software that implements power conservation.

Red, green, blue (RGB) color schemes are popular and suitable to characterize video information according to combinations of red, green and blue values. Video information is often stored according to an RGB scheme, while many display devices employ an RGB color scheme for video output. These display devices include a red, green, and blue optical modulation element for each pixel, such as individual RGB light emitting diode emitters for an OLED display device, individual RGB filters for an LCD device, or a digital micromirror element used in a projector that sequentially and selectively reflects incident red, green and blue light from a lamp and color wheel into a projection lens. In many RGB based devices, individual optical modulation elements receive commands for video output that include RGB values between 0 and 255 to produce a desired video output for a pixel. For example, one greenish color may initially comprise red/green/blue values of 45/251/62. According to luminance reduction techniques described above, the color may be darkened to 3/155/9, and subsequently darkened again to 2/90/9 (this maintains the relatively same hue for the greenish color).

In one embodiment, the present invention converts data to an HSL scheme and performs video alteration in the luminance domain. In a specific embodiment, the present invention sacrifices minor changes in color quality when performing luminance manipulation to permit greater luminance control and to achieve luminance targets and tailor luminance alteration changes. Depending on the size of the display device, the human eye generally detects changes in luminance more readily than changes in color; while the human eye can differentiate about 10 million colors, this level of differentiation is usually achieved by making side-by-side comparisons. The human eye can only identify about 300 different colors from memory. Luminance and luminance differences are often more detectable, but vary with size of the image (luminance sensitivity typically increases with display area size).

Video information alterations may be applied in a number of color schemes, as one of skill in the art will appreciate. An HSL color scheme characterizes video output according to a wavelength or color (hue), degree of purity of the color—or degree of separation from gray having the same color (saturation), and degree of brightness for the color ranging from black to white (luminance). Cyan, magenta, yellow and black (CMYK) is another color scheme regularly used to characterize video output from display device according to combinations of cyan, magenta, yellow and black values. In general, power conservation techniques described herein may be implemented regardless of the color scheme used to store the video information or employed by a graphics-based user interface, video controller or display device. Alterations and video conservation as described herein may also apply to black and white video output.

Translation between the color schemes is well known to one of skill in the art. Thus, power conservation techniques described herein may be programmed or stored according to one color scheme, and output according to another color scheme for the display device. For example, video data manipulation techniques described herein may be implemented and stored in an HSL scheme, and then converted to and output by an RGB based display device.

Hardware power consumption and conservation will vary with display technology for the display device.

OLED display devices provide pixel granularity power consumption—and permit pixel granularity power conservation. OLED devices include a red, green, and blue individual light emitting diode or filter for each pixel. OLED element power consumption is proportional to the light output; the amount of current sent to each light emitting diode or filter increases with each RGB color level between 0 and 255 (or other gradation). Decreasing the RGB levels then reduces the amount of power for each diode and pixel. For example, altering white background video information RGB values of 255/255/255 to a white shade of 235/235/235 reduces the amount of current sent to each individual light emitting diode for each pixel that emits the white shade. The amount of power conserved over the display area for the OLED display device can then be determined by summing the power saved for all pixels in the display area that have been altered.

Figure 4:
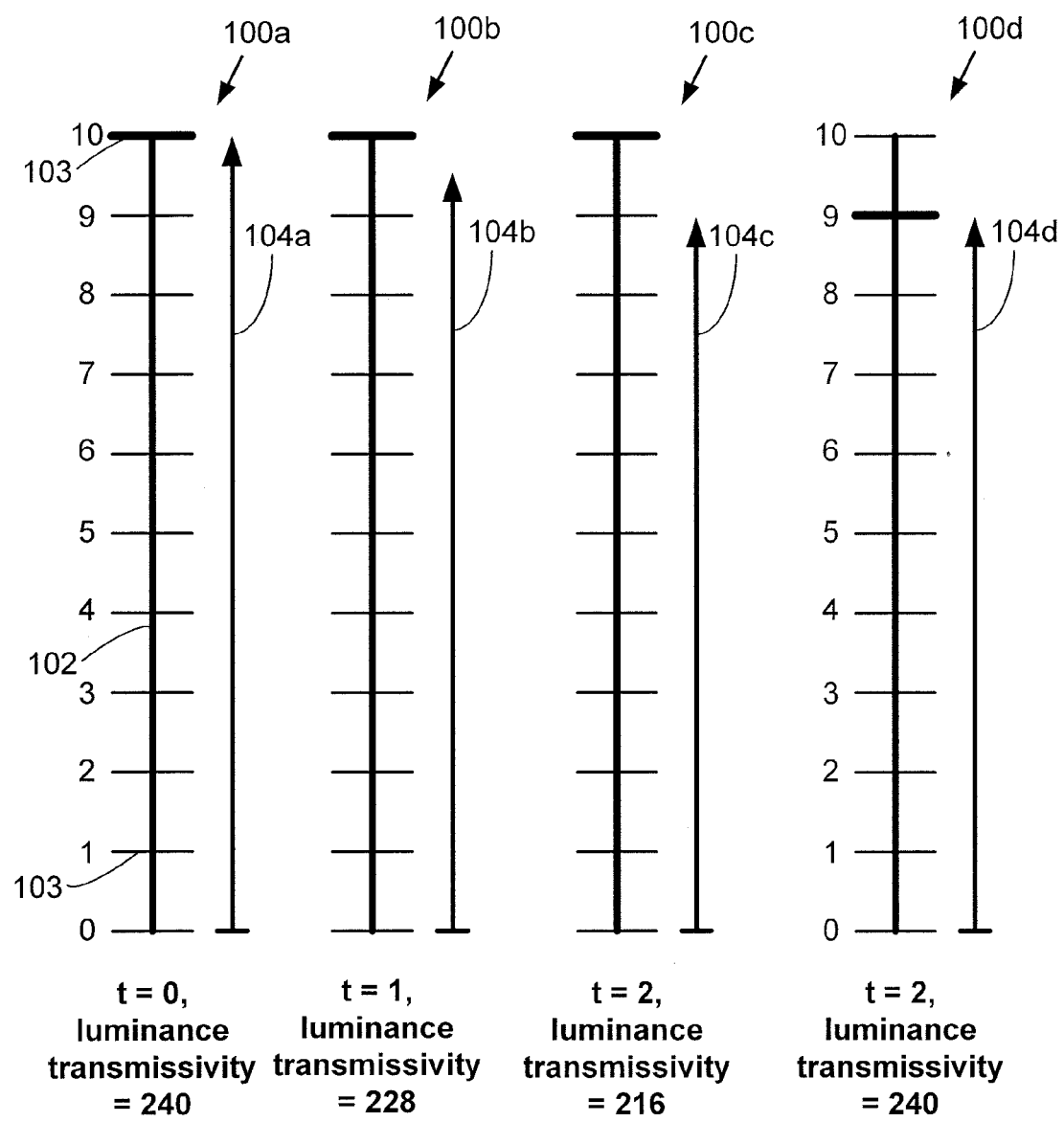
FIG. 4 shows video information alteration for an exemplary pixel for an LCD device to achieve power conservation in accordance with a specific embodiment of the present invention.

LCD display device power consumption (and conservation) largely relates to backlight levels and their varying power consumption. LCD devices provide two degrees of freedom for controlling luminance perceived by a user: 1) different luminance levels provided a backlight and 2) graduated filtering by optical modulation elements for each pixel. FIG. 4 shows video information alteration for an exemplary pixel for an LCD device to achieve power conservation in accordance with a specific embodiment of the present invention. Four luminance states 100a-d are shown at three different times: t=0, t=1 and t=2.

Scale 102 illustrates a number of backlight luminance levels 103 offered by a backlight used in an LCD device. In this simple illustration, the LCD provides ten discrete backlight levels 103, numbered from 0 to 10, where 0 is off and 10 represents the maximum luminance for the backlight. Each increasing integer luminance level between 0 and 10 provides a proportionate increasing luminance (each level represents about 10% the maximum luminance) for the backlight. Each level also consumes more power. More complicated backlight levels are contemplated and suitable for use.

Transmissivity refers to the amount of light passage provided by optical modulation elements for a pixel. Many LCD devices include red green and blue (RGB) filters that act as optical modulation elements, where each filter regulates passage of white light produced by the backlight through a colored filter element to produce red, green and blue light, respectively. Transmissivity for each pixel may then be expressed using RGB values sent on control signals to each RGB filter. LCD devices commonly include modulation elements that respond to RGB transmissivity values ranging from 0 to 255 (or normalized from 0 to 1). The video information and transmissivity may also be expressed and converted from another video data scheme, such as HSL luminance. For example, luminance for each pixel may be provided at integers between 0 and 240, where zero represents black (full filtering and blocking of light provided by the backlight for each RGB filter) and 240 represents white (no filtering and blocking of light provided by the backlight).

As the term is used herein, 'aggregate luminance' refers to a luminance output to (or perceived by) a viewer of an LCD device. This aggregate luminance combines luminance effects provided by a) the backlight and b) filtering provided by the optical modulation elements for each pixel. The aggregate luminance is typically limited to a maximum determined by the backlight level since the pixelated filters only reduce light currently offered by the backlight. For FIG. 4, maximum luminance for the LCD device corresponds to a backlight level of 10 and luminance transmissivity of 240. At backlight luminance level 9, the maximum aggregate luminance for video data corresponds to a luminance transmissivity of 240

(t=2). Aggregate luminance for the pixel is designated as 104*a-d* for FIG. 4 at each time instance.

Both the backlight level and the luminance transmissivity are controllable. In one embodiment, LCD power conservation leverages the two degrees of freedom in luminance control (and user perception) to reduce power for the LCD device.

At time t=0, the illustrated high luminance pixel (a white pixel) includes a backlight level of 10 and luminance transmissivity of 240, which corresponds to a maximum for the aggregate luminance and is designated as 104*a*.

LCD power conservation first alters video information for the pixel. This reduces transmissivity and perceived luminance for the pixel. For the example at time t=1, the backlight level remains at level 10 but the video information is altered to reduce the luminance transmissivity to 228. This provides an aggregate luminance of 104*b* (a darker shade). In this case, information has been altered but without a backlight change, and no power conservation has yet been achieved.

At time t=2, the backlight level still remains at level 10 but the video information is further altered to reduce the luminance transmissivity to 224 (an even darker shade). This provides an aggregate luminance of 104*c*. Aggregate luminance of 104*c* is noteworthy because it approximately corresponds to the aggregate luminance of 104*d* provided by the LCD device for the pixel when the backlight level drops to level 9 and the luminance transmissivity returns to 240 (its original level). At this luminance, the backlight level may drop from level 10 to level 9 while the luminance transmissivity simultaneously increases from 224 to 240—without changing the aggregate luminance of 104 output to the viewer—or as perceived by a viewer. In this manner, it is possible to alter video data using pixel video information and transmissivity to conserve power with a person not noticing a backlight change. Power consumption for the backlight and LCD device reduces when the backlight level changes from level 10 to level 9.

For an LCD, aggregate luminance is then manipulated for all pixels affected by a backlight (some LCD devices include more than one) at the change. Video information for the image is altered to produce a new maximum luminance that is less than the next or largest available luminance at the next backlight level. When this new maximum luminance has been achieved, the LCD switches to the next backlight level and simultaneously alters transmissivity to minimize impact of the backlight change. In a specific embodiment, the transmissivity changes are designed to enable backlight changes without a user noticing.

Although the above example has been simplified to illustrate two degree of freedom luminance control and power conservation using and LCD, power conservation as described herein is not limited to such simple expressions of backlit luminance levels and pixel transmissivity. The above example employed ten backlight luminance levels; other numbers of backlight luminance levels are contemplated. In general, the LCD device may include any number of backlight luminance levels. As the granularity of backlit luminance levels increases, so does power conservation and the ability to more readily use a lower backlight level. The backlight luminance levels also need not correspond to simple fractions of the maximum luminance or integer levels as described above. In addition, luminance transmissivity is not limited to expression using a range of 1-240. Other luminance transmissivity and color schemes, such as normalized scales, are also suitable for use. As one of skill in the art will appreciate, the number and characterization of backlight luminance levels will depend on the LCD used, while the number and characterization of video information will depend on the video scheme used to represent the video data.

Aggregate luminance thus allows a designer to relate backlight luminance levels and pixel transmissivity for an LCD device, which permits a designer to alter background and other video information and direct the alterations towards backlight luminance reductions. An aggregate luminance model may be built for a device that estimates luminance perceived by a user as a combination of backlight and pixilated transmissivity. For example, the aggregate luminance may be used to provide a ratio (or another suitable mathematical relationship) between the backlight luminance levels and pixel transmissivity.

One video alteration embodiment for LCD use sets a high luminance limit for a histogram of luminance after an alteration. The high luminance limit refers to a reference luminance level for video information in the display area that may be used to guide alteration, e.g., before changing a next backlight luminance on an LCD device. Video information for preserved graphics items may rest near the high luminance limit, while the background video information is altered to a lesser luminance in the histogram. This maintains visible salience of the graphics item video information relative to the background video information, and allows stepwise decreases in backlight luminance. This also allows luminance for any pixel in the image to remain relatively constant at the moment of each backlight level change (to produce little perceptible change). And, as mentioned above, the luminance may be altered gradually over time such that each of the transmissivity luminance changes is not individually detectable. Further description of LCD based power conservation suitable for use with the present invention is described in commonly owned pending U.S. Pat. No. 7,663,597 and entitled "LCD Plateau Power Conservation", which is incorporated herein in its entirety for all purposes.

Figure 5A:
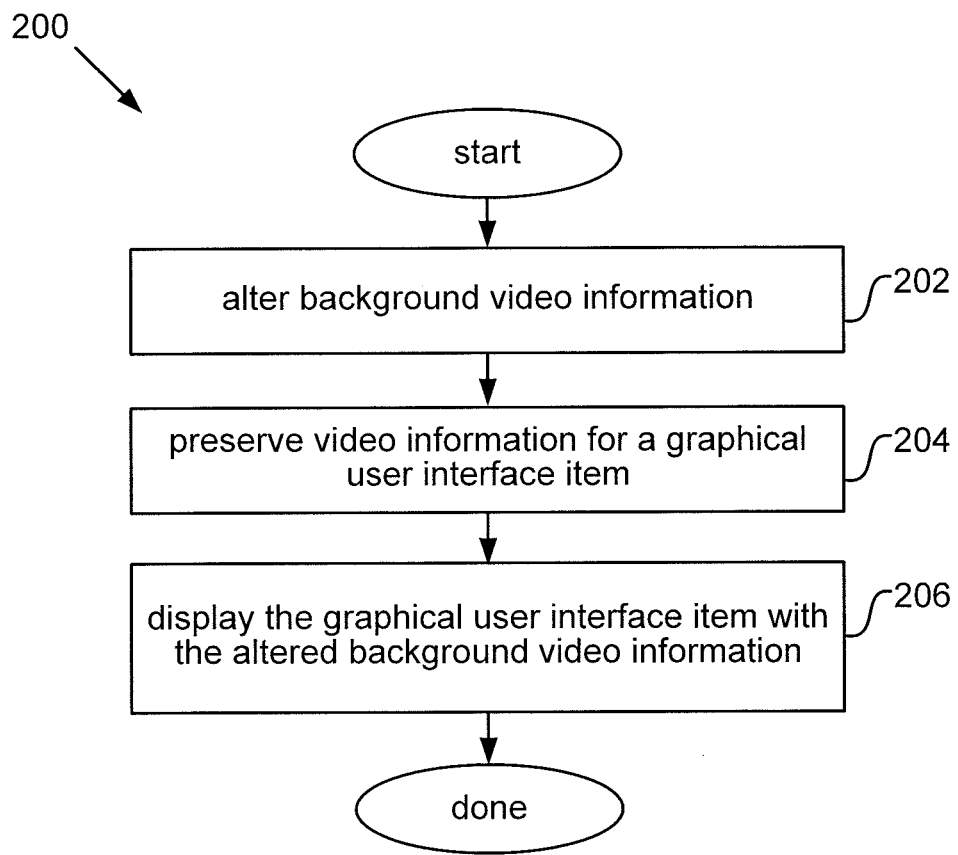
FIG. 5A illustrates a process flow for reducing power consumed by a display device in accordance with one embodiment of the invention.

FIG. 5A illustrates a process flow 200 for reducing power consumed by an electronics device and/or display device in accordance with one embodiment of the invention. While the present invention will now be described as a method and separable actions for reducing power consumption, those skilled in the art will recognize that the subsequent description may also illustrate hardware and/or software systems and items capable of performing the method and actions.

Process flow 200 begins by altering background video information to produce altered background video information (202). The video information is altered such that the display device will consume less power when displaying the altered background video information than an amount of power that would be required to display the background video information without the alteration. The amount of power saved will vary with the display device, as one of skill in the art will appreciate. For an OLED device, the power conservation is proportional to the reduction in RGB values for each pixel, summed for the entire background. For an LCD device, one suitable conservation technique to conserve power was described above. Other techniques are suitable for use.

The background video information may be variably identified. In one embodiment, the background video information refers to any video information in a backdrop, over which all icons and other active video information is overlaid. Such a backdrop may include a single color, a pattern, JPEG or bitmap image, etc. In another embodiment, the background video information refers to any video information not included in selected graphics items (204) and any other active programs being displayed.

Process flow 200 at least partially preserves video information for a graphical user interface item (204). This implies prior selection of at least one graphical user interface item. Selection may vary. In one embodiment, a power conservation program run on the electronics device automatically selects the graphical user interface item(s). In another embodiment, a user toggles a class of graphical user interface items using a power conservation graphics control offered by a graphical user interface. Some classes include: icons, toolbars, shortcut icons, and active window or program representations, for example. This allows the user or power conservation system designer to control what items are preserved.

In one embodiment, the present invention preserves video information that facilitates visual recognition of each graphics item. This may include: preserving characteristic color video information for a graphical user interface item that helps identify the graphics component based on its color (e.g., preserve the green in a dollar bill icon or the blue border in a blue bordered window); preserving characteristic edge detection video information that contributes to edge and/or shape recognition of the graphics component (e.g., the shape of a letter for an icon shaped as a letter); preserving characteristic window video that facilitates identification of a window (e.g., preserve window edge or color information for a window); and/or preserving other video information that facilitates visual detection of an icon. Preserving the characteristic video information maintains a person's ability to locate the graphics component at a later time, even though other portions of the display area have been altered to conserver power. This improves a person's ability to visually locate a graphics component in a display area. Since the video information being preserved often occupies a minor percentage of the display area, avoiding or minimizing power conservation video alterations for these relatively small portions does not contribute largely to power consumption—but maintains a person's ability to subsequently locate and return to using a graphics component and display area.

"At least partially preserves" implies that the graphical user interface item remains detectable after the alterations to the background video information. In one embodiment, video information for the graphical user interface item(s) is left untouched and unaltered. Background alterations may then make the graphics items more detectable (see FIG. 1C). In another embodiment, video information for the graphics item(s) is also altered to decrease power consumption, e.g., for direct power conservation in an OLED device, or to enable lower backlight levels in an LCD device. As mentioned with respect to FIGS. 1A-1D, video information for one or more graphics items may be altered and degraded to various degrees—so long as a minimum detection criterion remains relative to the background video information. In this case, video information for the graphical user interface item is typically altered less aggressively than the video information outside its boundaries to maintain detectability. Regardless of alteration, the present invention preserves a person's ability to see and detect the graphical user interface item(s) at a later time when the background video information has been significantly altered.

In a specific embodiment, background video information alters immediately upon inactivity in the display area. One suitable luminance reduction scheme decreases luminance incrementally and alters video information at power reduction intervals that begin immediately upon user inactivity and have a frequency of greater than 1 alteration every 5 seconds. In this case, the incremental reductions decrease luminance by a small amount each time such that each individual alteration is not readily noticeable to a user. Cumulatively, however, the incremental alterations accumulate to produce a significant change, such as a 50 percent reduction in luminance for the background and graphics components over five minutes, for example. The gradual rate of alteration may be established according to power conservation system design or user preference, and advantageously allows video information to alter without substantially noticeable momentous changes (human visual perception is generally very sensitive to luminance changes, but depends on the size of the display). A magnitude for each incremental alteration may be determined by dividing a desired total alteration over a period of time by the number of intervals in the time period. For example, the progressive changes may occur as often as desired to produce a backlight luminance level change in an LCD device every 30 seconds. The backlight luminance level change may then occur without any individual changing aggregate luminance from the display being perceived by a user.

The altered background video information and at least one graphical user interface item are then displayed together on the display device (206). Since the background video information often occupies a major percentage of the display area, alteration of the video for these portions can lead to significant luminance decreases and power conservation—while maintaining a person's ability to subsequently detect and use the preserved graphics items.

Altered video information may return—or reactivate—to its original state from an altered state after user activity with the display area, or as otherwise designated by a power conservation program designer. Reactivation typically displays the display area as it was initially displayed before any alterations. In a specific embodiment, positioning a pointer onto an area of a display area triggers reactivation. Reactivation may also include initiating graphics window via its corresponding toggle on a toolbar. Power conservation system designers may also customize reactivation rules. For example, reactivation may be designed such that solely positioning and moving a pointer within a window or background does not satisfy reactivation criteria. In this case, clicking a button on a mouse while the pointer is within the window, or another explicit action within the graphics component, may satisfy reactivation.

Figure 5B:
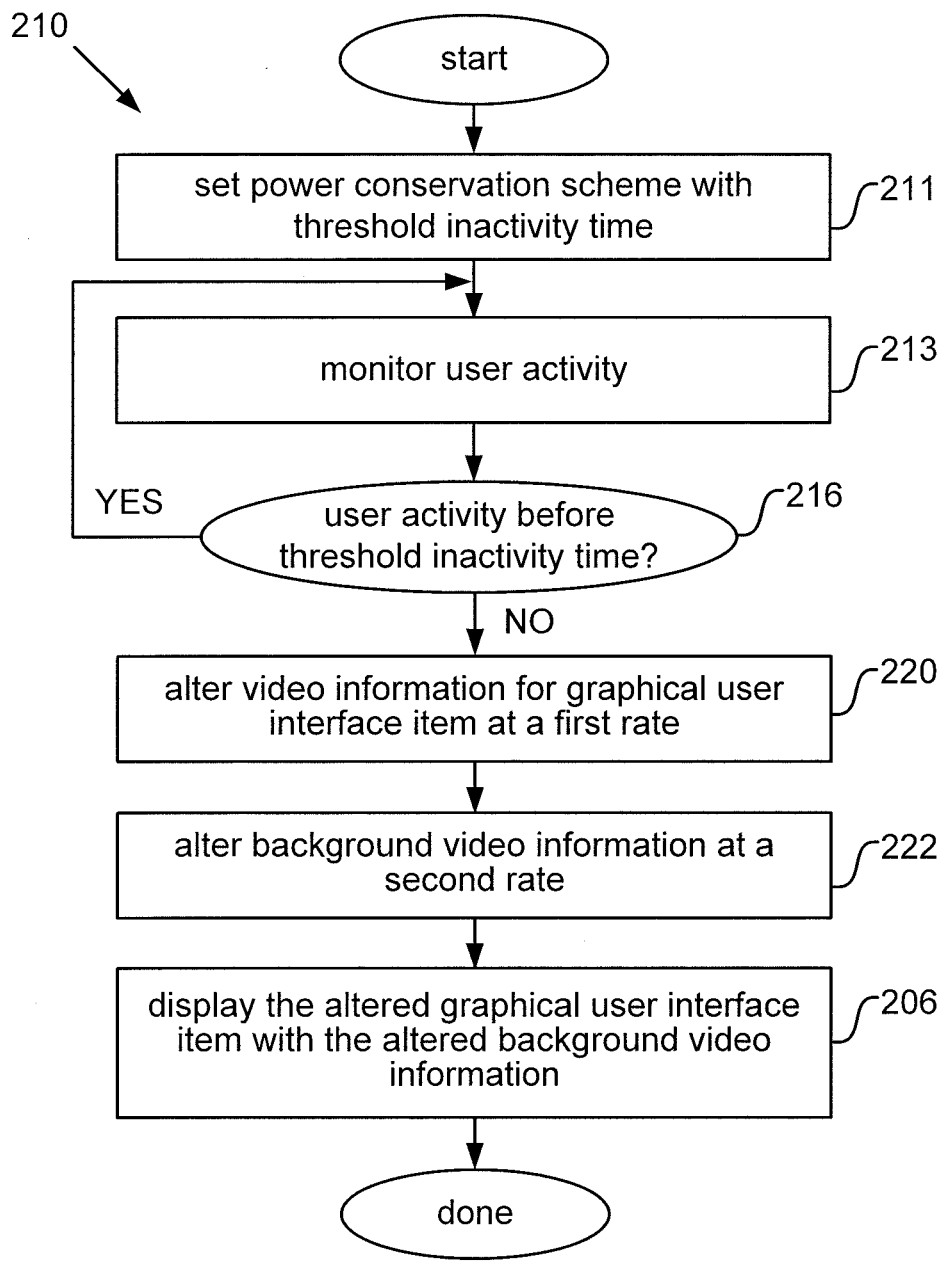
FIG. 5B illustrates a process flow for reducing power consumed by a display device in accordance with another embodiment of the invention.

FIG. 5B illustrates a process flow 210 for reducing power consumed by an electronics device and/or display device in accordance with another embodiment of the invention. Process flow 210 begins by setting a power conservation scheme (211). A power scheme refers to a collection of power options that dictate how and when video information is altered to reduce power consumption. In one embodiment, a power conservation system is stored on a computer and implements a power conservation scheme without user input. In another embodiment, a graphics control allows a user to set a power scheme or one or more power options corresponding to techniques described herein, e.g., select one or more types of graphical user interface item for video preservation.

For process flow 210, the power conservation scheme uses a threshold inactivity time to determine when alterations to video data begin. The threshold inactivity time may beset by a user via a graphics control, or automatically with power conservation system design. Once the threshold inactivity time has been reached, video information is altered to reduce power consumption.

After the power conservation scheme has been established, process flow 200 monitors user activity within the display area (213). Process flow 210 continues to monitor activity over time and reacts according to any user activity or lack thereof (216). If user activity occurs in the display area, process flow 210 then resets the inactivity monitor clock and returns to 213. If user inactivity continues until the threshold inactivity time, then process flow 210 alters background video information.

In this embodiment, video information for the graphical user interface items is also altered. In this case, alterations to video information for the graphical user interface items occur at a lesser rate than that for the background video information. Process flow 200 proceeds by altering the video information for each graphical user interface item at a first rate (220). The change may include reducing the luminance for each graphical user interface item such that a next luminance level in an LCD device may be employed.

Power conservation also alters the background video information (222). Suitable techniques for altering video information outside the graphical user interface item were described above.

In this case, the video information for the graphical user interface item alters at a lesser rate than the background video information. In one temporally varying embodiment, alterations to video information occur at set power reduction intervals. The power reduction intervals determine specific regular times at which minor but additive video alterations are applied. In this case, alterations to the graphical user interface item may occur less frequently (at larger intervals) than for video information outside the graphical user interface item. For example, progressive and stepwise changes to RGB values of the graphical user interface item may occur every twenty seconds while progressive and stepwise changes to RGB values of background video information may occur every ten seconds. Other intervals may be used. In one embodiment, a power reduction interval from one second to about 3 minutes is suitable. In another embodiment, a power reduction interval from about 1 second to about 10 seconds is suitable. It is understood that power reduction intervals are a matter of system design and user choice and may be include different time periods that those specifically provided herein.

The difference in rate of alteration may also include changes at the same frequency—but by different amounts at each interval. In this case, the background video information is altered more aggressively at each interval than that of each graphical user interface item.

In one embodiment, power conservation as described herein is implemented without user input. In another embodiment, a computer system provides a user the ability to turn on/off power conservation or tailor the power conservation to personal preferences that include the ability to preserve video information for one or more graphical user interface items.

Inactivity within the display area may be further monitored and timed. The graphics-based user interface may include a global power saving tool that initiates after a predetermined time of inactivity throughout the entire display area. In this case, the global power saving tool turns off video display for the entire display area, including the graphical user interface items being preserved, when inactivity reaches the global power saving tool time limit, e.g., such as 5 minutes.

The present invention may also relate to systems for reducing power consumed by a display device. The power conservation system may comprise any combination of software and hardware for carrying out actions described herein. In a specific embodiment, general-purpose computer processing units, instead of dedicated hardware, implement the monitoring and video alteration techniques. Further description of power conservation systems suitable for use with the present invention is provided in commonly owned U.S. Pat. No. 7,580,033, which was incorporated by reference above.

Figure 6:
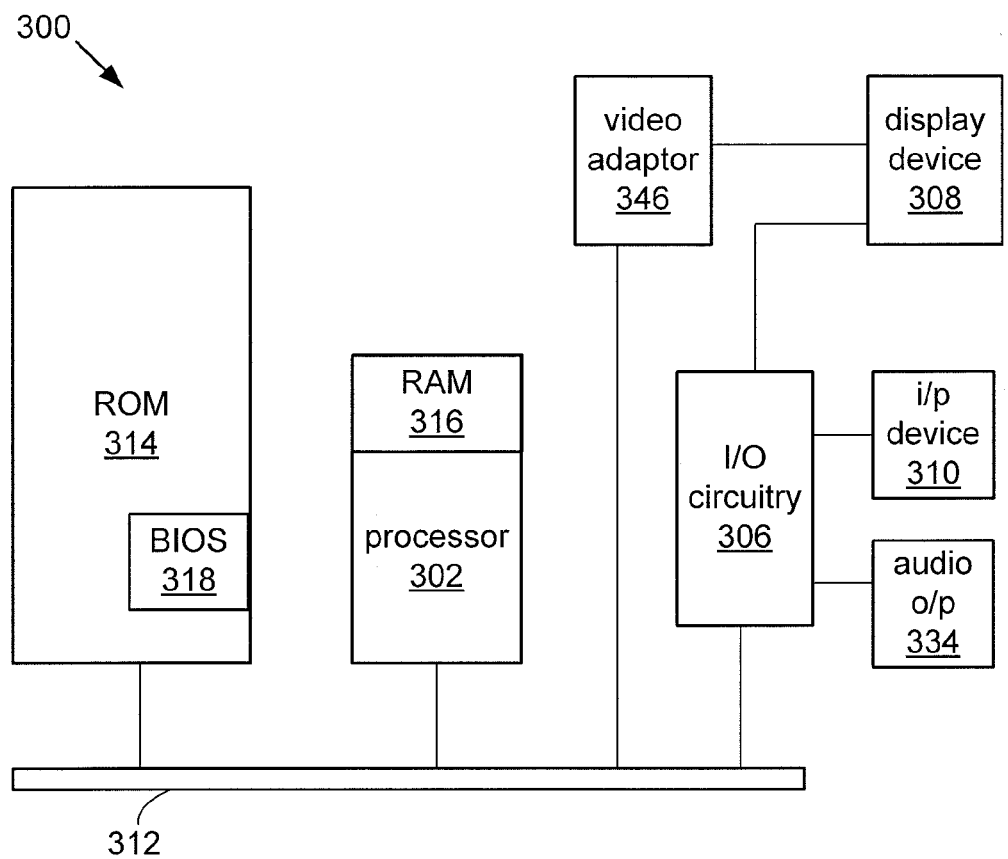
FIG. 6 illustrates an exemplary computer system suitable for implementing the invention.

The present invention finds use with computer systems such as desktop and laptop computers, personal digital assistants (PDAs), cellular telephones, digital cameras, portable computer systems, and the like. FIG. 6 schematically illustrates an exemplary general-purpose computer system 300 suitable for implementing the present invention.

Computer system 300 comprises a processor, or CPU, 302, one or more memories 314 and 316, input/output (I/O) circuitry 306, display device 308, input device 310, and system bus 312. System bus 312 permits digital communication between the various components within system 300.

System 300 memory includes read only memory (ROM) 314 and random access memory (RAM) 316. Other memories may be included. ROM 314 stores a basic input/output system 318 (BIOS), containing basic routines that help to transfer information between elements within computer system 300, such as during start-up. Computer system 300 may also include a hard disk drive and an optical disk drive, for example. The optical disk drive reads from and may write to a CD-ROM disk or other optical media. The drives and their associated computer-readable media provide non-volatile storage for system 300. A number of program modules may be stored in the drives, ROM 314, and/or RAM 316, including an operating system, one or more application programs, other program modules, and program data. Although data storage above refers to a hard disk and optical disk, those skilled in the art will appreciate that other types of storage are suitable for use with a computer system, such as magnetic cassettes, flash memory cards, USB memory sticks, and the like. In addition, not all computer systems, such as PDAs and other portable devices may include multiple external memory options.

Processor 302 is a commercially available microprocessor such as one of the Intel or Motorola family of chips, or another suitable commercially available processor. Processor 302 digitally communicates with ROM 314 via system bus 312, which may comprise a data bus, control bus, and address bus for communication between processor 302 and memory 314. CPU 302 is also coupled to the I/O circuitry 306 by system bus 312 to permit data transfers with peripheral devices.

I/O circuitry 306 provides an interface between CPU 302 and such peripheral devices as display device 308, input device 310, audio output 334 and/or any other I/O device. For example, a mouse used as input device 310 may digitally communicate with processor 302 through a serial port 306 that is coupled to system bus 312. Other interfaces, such as a game port, a universal serial bus (USB) or fire wire, may also provide digital communication between a peripheral device and processor 302. I/O circuitry 306 may also include latches, registers and direct memory access (DMA) controllers employed for interface with peripheral and other devices. Audio output 334 may comprise one or more speakers employed by a headphone or speaker system.

Display device 308 outputs video information—both unaltered and altered—including graphics components, backgrounds, graphics-based user interfaces, and other visual representations of data. For example, display device 308 may comprise a cathode ray tube (CRT), liquid crystal display (LCD), organic light emitting diode (OLED), or plasma display, of the types commercially available from a variety of manufacturers. Display device 308 may also comprise one or more optical modulation devices, or the like, used in projecting an image. Projection display devices that project an image onto a receiving surface are becoming more popular, less expensive, more compact; and may employ one or more optical modulation technologies as well as a wide variety of individual designs. Common optical modulation devices include those employing liquid crystal display (LCD) technology and digital mirror device (DMD) technology. When used as a display device for a computer, these projection devices provide the potential for a much larger image size and user interface.

In general, the present invention is not limited to use with any particular display device. The present invention is independent of any particular display device technology, any mechanism of light generation for a display device, or any power consumption scheme for a display device, and only assumes that power consumption for display device 158 may vary with video information or visual reception of the video information. In a specific embodiment, display device 158 can vary power consumption spatially on a pixel-by-pixel basis.

Display device 308 may also digitally communicate with system bus 306 via a separate video interface, such as a video adapter 346. Video adapter 346 assists processor 302 with video graphics processing including power conservation alterations described herein. Video adapter 346 may be a separate graphics card or graphics processor available from a variety of vendors that are well known in the art.

Input device 310 allows a user to enter commands and information into the computer system 300, and may comprise a keyboard, a mouse, a position-sensing pad on a laptop computer, a stylus working in cooperation with a position-sensing display on a PDA, or the like. Other input devices may include a remote control (for a projector), microphone, joystick, game pad, scanner, or the like. As used herein, input device refers to any mechanism or device for entering data and/or pointing to a particular location on an image of a computer display. Input as described herein may also come through intermediary devices. For example, a remote control may communicate directly with processor 302, or through an intermediary processor included in another device such as a hybrid entertainment device such as a set-top box or projector. The user may then input information to computer system 300 using an infrared remote control device that communicates first with the intermediary device, and then to processor 302.

In one embodiment, a graphics-based user interface implemented by computer system 300 displays a graphics control such as control described above. To display a power conservation graphics control, processor 302 issues an appropriate command, followed by an identification of data that is to be used to construct the graphics control. Such data may include a number of power conservation control tools that allow a user to change how video data is altered. ROM 314 also stores a number power conservation commands and instructions for implementing the techniques described herein. In one embodiment, the present invention is practiced in the context of an application program that runs on an operating system implemented by computer system 300 or in combination with other program modules on computer system 300.

The present invention may be implemented on a range of computer systems. In addition to personal computers such as desktop computers and laptop computers, a variety of other computer systems and computer devices employing a digital processor, memory and a display device may implement the present invention. Handheld computers and other small portable digital devices such as cell phones and digital cameras are increasingly integrating video display and computer functionality. One current trend is hybrid entertainment devices that integrate the functionality of computer systems, audio devices, and televisions. Any of these devices may employ and benefit from the power conservation methods and systems described herein. The scope of digital computer systems is expanding hurriedly and creating new devices that may employ the present invention. In general, any digital device employing an output display device that varies output power with video content may benefit from the present invention. Moreover, those skilled in the art will appreciate that the invention may be practiced with other computer system configurations, multiple display device systems, multi-processor systems, microprocessor-based or programmable consumer electronics, minicomputers, mainframe computers, and the like.

The present invention is particularly useful to portable computing devices run with battery power. Most handheld devices are designed to rely on battery power. In addition, although the present invention has been discussed with respect to reduced power consumption, energy and power are relatively interchangeable in a discussion of the benefits of conservation.

Embodiments of the present invention further relate to computer readable media that include program instructions for performing power conservation techniques described herein. The media and program instructions may be those specially designed and constructed for the purposes of the present invention, or any kind well known and available to those having skill in the computer software arts. Examples of computer-readable media include, but are not limited to, magnetic media such as hard disks, semiconductor memory, optical media such as CD-ROM disks; magneto-optical media such as optical disks; and hardware devices that are specially configured to store program instructions, such as read-only memory devices (ROM), flash memory devices, EEPROMs, EPROMs, etc. and random access memory (RAM). Examples of program instructions include both machine code, such as produced by a compiler, and files containing higher-level code that may be executed by the computer using an interpreter.

Graphics controls and graphics-based user interfaces such as those described herein may be implemented using a number of computer languages and in a number of programming environments. One suitable language is Java, available from Sun Microsystems of Sunnyvale, Calif. Another suitable programming environment is the Microsoft Windows® programming environment, which provides a series of operating systems suitable for implementing the present invention both on laptop computers and handheld computers.

Although the foregoing invention has been described in some detail for purposes of clarity of understanding, those skilled in the art will recognize that various modifications may be made within the scope of the appended claims. In addition, although power consumption and conservation has not been detailed for every type of display device, the present invention is suitable with any display technology that can vary power output with video information. Projectors, for example, consume power based on the amount of light produced, which may be reduced using techniques described herein. The invention is, therefore, not limited to the specific features and embodiments described herein and claimed in any of its forms or modifications within the scope of the appended claims.

What is claimed is:

1. A method for reducing power consumed by a liquid crystal display device, the method comprising:
    displaying an active graphics component in a first portion of a display area provided by the liquid crystal display device;
    immediately upon determination of user inactivity in an inactive portion of the display area that is outside the first portion which has not been determined to include user inactivity, altering video information in the inactive portion; and reducing backlit luminance of the liquid crystal display device and increasing transmittance of the liquid crystal display panel.

2. The method of claim 1, wherein the reducing of backlit luminance of the liquid crystal display device and the increasing of transmittance of the liquid crystal display panel comprises:
reducing backlit luminance of the liquid crystal display device and increasing transmittance of the liquid crystal display panel for the first portion of the display area.

3. The method of claim 2, wherein the altering of video information in the inactive portion comprises:
altering video information to a lower grey level compared to a original video information in the inactive portion.

4. The method of claim 3, wherein the reducing of backlit luminance of the liquid crystal display device and the increasing of transmittance of the liquid crystal display panel comprises:
together with the altering video information in the inactive portion, reducing backlit of the liquid crystal display device and increasing transmittance of the liquid crystal display panel for the first portion of the display area, thereby reducing power consumption of the liquid crystal display without serious image quality deterioration of the active graphics component.

5. An apparatus for reducing power consumed by a liquid crystal display device, the apparatus comprising:
a liquid crystal display device for displaying an active graphics component in a first portion of a display area provided by the liquid crystal display device; and
a power conservation control for altering, immediately upon determination of user inactivity in an inactive portion of the display area that is outside the first portion which has not been determined to include user inactivity, video information in the inactive portion and reducing backlit luminance of the liquid crystal display device and increasing transmittance of the liquid crystal display panel.

6. The apparatus of claim 5, wherein the power conservation control reduces backlit luminance of the liquid crystal display device and increases transmittance of the liquid crystal display panel for the first portion of the display area.

7. The apparatus of claim 6, wherein the power conservation control alters video information to a lower grey level compared to a original video information in the inactive portion.

8. The apparatus of claim 7, wherein the power conservation control reduces, together with the altering video information in the inactive portion, backlit of the liquid crystal display device and increases transmittance of the liquid crystal display panel for the first portion of the display area, thereby reduces power consumption of the liquid crystal display without serious image quality deterioration of the active graphics component.

9. The method of claim 1, wherein the inactive portion comprises a plurality of inactive sub-portions, and
wherein the altering of video information in the inactive portion comprises respectively altering the video information in the plurality of inactive sub-portions.

10. The method of claim 9, wherein the altering of the video information in the plurality of inactive sub-portions comprises altering video information in a first inactive sub-portion differently from an altering of video information in a second inactive sub-portion.

11. The method of claim 10, wherein the video information in the first inactive sub-portion is altered at a rate different from a rate at which the video information in the second inactive sub-portion is altered.

12. The method of claim 9, wherein at least one of the plurality of inactive sub-portions is respectively altered according to at least one of a characteristic and a function of the corresponding inactive sub-portion.

13. The method of claim 1, wherein the altering of video information in the inactive portion comprises gradually altering the video information in the inactive portion according to a length of inactivity time for the inactive portion.

14. A method for reducing power consumed by a liquid crystal display device, the method comprising:
displaying an active graphics component in a first portion of a display area provided by the liquid crystal display device;
in response to a determination of user inactivity in an inactive portion of the display area that is outside the first portion which has not been determined to include user inactivity, altering video information in the inactive portion; and
reducing backlit luminance of the liquid crystal display device and increasing transmittance of the liquid crystal display panel.

15. An apparatus for reducing power consumed by a liquid crystal display device, the apparatus comprising:
a liquid crystal display device for displaying an active graphics component in a first portion of a display area provided by the liquid crystal display device; and
a power conservation control for altering, in response to a determination of user inactivity in an inactive portion of the display area that is outside the first portion which has not been determined to include user inactivity, video information in the inactive portion and reducing backlit luminance of the liquid crystal display device and increasing transmittance of the liquid crystal display panel.

16. A non-transitory computer readable medium including executable instructions for reducing power consumed by a liquid crystal display device, the executable instructions comprising:
instructions for displaying an active graphics component in a first portion of a display area provided by the liquid crystal display device;
immediately upon determination of user inactivity in an inactive portion of the display area that is outside the first portion which has not been determined to include user inactivity, instructions for altering video information in the inactive portion; and
instructions for reducing backlit luminance of the liquid crystal display device and increasing transmittance of the liquid crystal display panel.

17. A non-transitory computer readable medium including executable instructions that, when executed by one or more processors, perform a method for reducing power consumed by a liquid crystal display device, the method comprising:
displaying an active graphics component in a first portion of a display area provided by the liquid crystal display device;
in response to determination of user inactivity in an inactive portion of the display area that is outside the first portion which has not been determined to include user inactivity, altering video information in the inactive portion; and
reducing backlit luminance of the liquid crystal display device and increasing transmittance of the liquid crystal display panel.

* * * * *